United States Patent [19]

Zirngibl

[11] 4,026,914
[45] May 31, 1977

[54] STYRYL DYES

[75] Inventor: Ulrich Zirngibl, Oberwil, Switzerland

[73] Assignee: Sandoz Ltd., Basel, Switzerland

[22] Filed: Sept. 29, 1975

[21] Appl. No.: 617,822

[30] Foreign Application Priority Data

Oct. 4, 1974 Switzerland .................... 13381/74

[52] U.S. Cl. .......................... 260/465 D; 8/41 R; 8/41 B; 8/41 C; 8/54.2; 8/178 R; 8/179; 260/207; 260/207.1; 260/329.3; 260/330.5; 260/332.1; 260/340.3; 260/340.5; 260/343.2 R; 260/346.2 R; 260/346.2 M; 260/471 C

[51] Int. Cl.² .............. C07C 121/70; C07C 125/06

[58] Field of Search .................... 260/465 D

[56] References Cited

UNITED STATES PATENTS

| | | | |
|---|---|---|---|
| 2,850,520 | 9/1958 | Merian | 260/465 |
| 3,808,255 | 4/1974 | Schweizer et al. | 260/465 |
| 3,808,256 | 4/1974 | Scheuermann | 260/465 |

Primary Examiner—Dolph H. Torrence
Attorney, Agent, or Firm—Gerald D. Sharkin; Richard E. Vila; Thomas C. Doyle

[57] ABSTRACT

Disclosed are compounds of formula I,

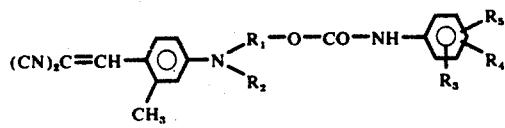

in which
$R_1$ is $C_{2-8}$alkylene or $C_{5-8}$cycloalkylene,
$R_2$ is $C_{5-8}$cycloalkyl, unsubstituted or substituted by up to 3 methyl groups; or $C_{1-8}$alkyl, unsubstituted or substituted by a $C_{1-4}$alkoxy, $C_{1-4}$alkylthio, $C_{1-4}$alkylcarbonyloxy, $C_{1-4}$alkoxycarbonyloxy or $C_{1-4}$alkoxycarbonyl, either $R_3$ is hydrogen, halogen, $C_{1-4}$alkyl, $C_{1-4}$alkoxy or $C_{1-4}$alkoxycarbonyl, and $R_4$ is halogen, cyano, trifluoromethyl, $C_{5-8}$cycloalkyl, $C_{1-4}$alkoxy, $C_{5-8}$cycloalkoxy, $C_{1-4}$alkylthio, $C_{5-8}$cycloalkylthio, phenyl, phenoxy, phenylthio, phenylthio-$C_{1-4}$alkyl, phenyl-$C_{1-4}$alkyl, phenoxy-$C_{1-4}$alkyl, phenylazo, $C_{1-4}$alkoxycarbonyl, $C_{5-8}$cycloalkoxycarbonyl, phenoxycarbonyl, benzoyl, benzoyloxy, phenoxycarbonyloxy, phenylsulphonyloxy or phenyl-$C_{1-4}$alkylthio, or $R_3$ and $R_4$ are located on adjacent carbon atoms and, together with such atoms, form a 5- or 6-membered, otherwise saturated, unsaturated or aromatic, carbo- or heterocyclic ring, optionally having a benzene ring fused thereto, and $R_5$ is hydrogen, chlorine, bromine, methyl or methoxy;

any alkyl or alkoxy radical as $R_3$ or $R_4$ being optionally substituted by $C_{1-4}$alkoxy, phenyl or $C_{1-4}$alkoxycarbonyl;

any cycloalkyl radical or moiety as or contained in $R_3$ or $R_4$ being optionally substituted by up to 3 methyls or by $C_{1-4}$alkoxy, phenyl or $C_{1-4}$alkoxycarbonyl;

any phenyl radical or moiety as or contained in $R_4$ being optionally substituted by up to two substituents selected from halogen, methyl, $C_{1-4}$alkoxy and $C_{1-4}$alkoxycarbonyl, with the proviso that any alkoxy radical substituted by alkoxy is of at least two carbon atoms, their production and use as disperse dyes, particularly for polyester, cellulose acetate and synthetic polyamide substrates.

11 Claims, No Drawings

STYRYL DYES

The invention relates to styryl compounds.
The invention provides compounds of formula I,

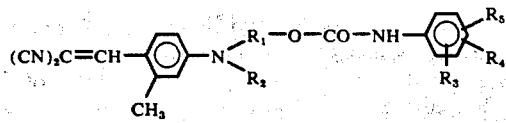

in which
R₁ is C₂₋₈alkylene or C₅₋₈cycloalkylene,
R₂ is C₅₋₈cycloalkyl, unsubstituted or substituted by up to 3 methyl groups; or C₁₋₈alkyl, unsubstituted or substituted by a C₁₋₄alkoxy, C₁₋₄alkylthio, C₁₋₄alkylcarbonyloxy, C₁₋₄alkoxycarbonyloxy or C₁₋₄alkoxycarbonyl,
either R₃ is hydrogen, halogen, C₁₋₄alkyl, C₁₋₄alkoxy or C₁₋₄alkoxycarbonyl,
and R₄ is halogen, cyano, trifluoromethyl, C₅₋₈cycloalkyl, C₁₋₄alkoxy, C₅₋₈cycloalkoxy, C₁₋₄alkylthio, C₅₋₈cycloalkylthio, phenyl, phenoxy, phenylthio, phenylthio-C₁₋₄alkyl, phenyl-C₁₋₄alkyl, phenoxy-C₁₋₄alkyl, phenylazo, C₁₋₄alkoxycarbonyl, C₅₋₈-cycloalkoxycarbonyl, phenoxycarbonyl, benzoyl, benzoyloxy, phenoxycarbonyloxy, phenylsulphonyloxy or phenyl-C₁₋₄alkylthio,
or R₃ and R₄ are located on adjacent carbon atoms and, together with such atoms, form a 5- or 6-membered, otherwise saturated, unsaturated or aromatic, carbo- or heterocyclic ring, optionally having a benzene ring fused thereto, and
R₅ is hydrogen, chlorine, bromine, methyl or methoxy;
any alkyl or alkoxy radical as R₃ or R₄ being optionally substituted by C₁₋₄alkoxy, phenyl or C₁₋₄alkoxycarbonyl;
any cycloalkyl radical or moiety as or contained in R₃ or R₄ being optionally substituted by up to 3 methyls or by C₁₋₄alkoxy, phenyl or C₁₋₄alkoxycarbonyl;
any phenyl radical or moiety as or contained in R₄ being optionally substituted by up to two substituents selected from halogen, methyl, C₁₋₄alkoxy and C₁₋₄alkoxycarbonyl, with the proviso that any alkoxy radical substituted by alkoxy is of at least two carbon atoms.

As used herein, halogen is to be understood to include fluorine, chlorine, bromine and iodine, of which chlorine and bromine are preferred.

"C₁₋₄" in such terms as "C₁₋₄alkoxycarbonyl" and "C₁₋₄alkylcarbonyloxy" is intended to mean that the alkoxy or alkyl moieties therein contain 1 to 4 carbon atoms.

Where R₁ is cycloalkylene, such is preferably bound to the N and O atoms through adjacent carbon atoms, and the preferred cycloalkylenes are of 5- or 6-carbon atoms, particularly the former.

Where R₁ is C₂₋₈alkylene, as is preferred, such is preferably C₂₋₄, there being 2 or more, preferably 2, carbon atoms between the N and O atoms. Particularly preferred alkylenes as R₁ are 1,2-ethylene, 1,2-propylene and 1,2-butylene (the 1-C-atom being bound to the nitrogen), of which 1,2-ethylene is the most preferred.

The preferred cycloalkyl radicals or moieties, particularly as R₂, are cyclopentyl and cyclohexyl, particularly the unsubstituted such radicals and moieties.

Where R₂ is alkyl, as is preferred such radical, whether substituted or not, is preferably of 2 to 8, especially 2 to 4, carbon atoms, and, where substituted, the preferred substituents are C₁₋₄alkoxy radicals. The alkyl radicals as R₂ are, however, most preferably unsubstituted, the most preferred alkyl radicals as R₂ being ethyl and n-butyl, particularly the latter.

R₃ and R₄ are preferably other than joined to form a ring. However, as examples of such rings may be given those hereinafter set forth in Examples 123 to 150.

R₃ is preferably hydrogen, chlorine, bromine, C₁₋₄alkyl (preferably methyl), C₁₋₄alkoxy (preferably methoxy) or C₁₋₄alkoxycarbonyl (preferably methoxy- or ethoxycarbonyl), more preferably hydrogen, chlorine or bromine, most preferably chlorine.

R₄ is preferably chlorine, bromine, cyano, trifluoromethyl, cyclohexyl, C₁₋₄alkoxy, cyclohexyloxy, C₁₋₄alkylthio, phenyl, phenoxy, phenylthio, phenyl-C₁₋₄alkyl, phenyl-C₁₋₄alkoxy, phenoxy-C₁₋₄alkyl, C₁₋₄alkoxycarbonyl, phenoxycarbonyl, phenylsulphonyloxy or phenylazo, more preferably chlorine, bromine, cyano, C₁₋₄alkoxycarbonyl or phenylazo, most preferably chlorine.

R₅ is preferably hydrogen, chlorine, methyl or methoxy, more preferably hydrogen.

As will be appreciated, the phenyl moiety in the phenylaminocarbonyloxy radical in the compounds of formula I, when not having a ring fused thereto, is mono-, di- or tri-substituted. In the most preferred compounds of the invention, the phenyl moiety is di-substituted, preferably at least one of said substituents, more preferably both, being chlorine or bromine, particularly the former.

The invention also provides a process for the production of compounds of formula I, which process comprises reacting a compound of formula II,

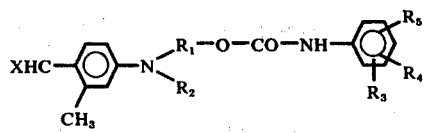

in which
R₁ to R₅ are as defined above, and
X is oxygen or =⁺NR₅R₆ A⁻, preferably oxygen,
where either
R₅ is alkyl, preferably of 1 to 4 carbon atoms,
and R₆ is alkyl, preferably of 1 to 4 carbon atoms, or phenyl,
or R₅ and R₆, together, form a 4- or 5-membered alkylene chain, and
A⁻ is an anion, preferably Cl⁻, Br⁻ or PO₂Cl₂⁻ with malononitrile, preferably in a mol ratio of 1:1.

The reaction is conveniently carried out in conventional manner, suitably in an inert solvent, e.g. in a lower alkanol such as ethanol or methanol. Preferably the reaction is carried out in the presence of an organic base, e.g. in piperidine, pyrrolidone, pyridine, triethylamine or triethanolamine. A suitable reaction temperature is from 50° to 150° C, reflux temperature being preferred.

The resulting compounds of formula I may be isolated and purified in conventional manner.

The compounds of formula II may be obtained in conventional manner, e.g. using the Vilsmeyer reaction, from available starting materials.

The compounds of formula I are disperse dyes and are indicated for use in the dyeing and printing of substrates comprising or consisting of synthetic or semi-synthetic, hydrophobic, high-molecular weight materials, such as textile substrates comprising or consisting of linear aromatic polyester, cellulose 2½ acetate, cellulose triacetate or synthetic polyamide material, such substrates being in conventional form, e.g. fiber, filament, woven, non-woven etc. forms. The substrates may be dyed in conventional manner, e.g. as described in French Pat. No. 1,445,371, using conventional amounts of dyestuff.

As is conventional for disperse dyes, the compounds of formula I may be formed into dyeing preparations, e.g. by milling in the presence of dispersing agents and/or fillers, followed by vacuum or spray drying.

The dyeings obtained employing the compounds of formula I, particularly the preferred such compounds, possess satisfactory all-round fastness properties, e.g. to light, water, sea-water, washing, perspiration, rubbing, overdyeing, ozone, flue gases and chlorine. The dyes show a resistance to reduction (when dyeing wool containing substrates) and they reserve wool and cotton. Of particular interest is the resistance of the compounds, particularly the preferred compounds, to sublimation and thermofixation, their good stability to hydrolysis and levelling properties. Also of interest is their dyeing strength (by weight and by mol), rate of take-up and their build-up power on cellulose triacetate and synthetic polyamide, particularly nylon 6.6.

The following Examples, in which all parts and percentages are by weight and the temperatures in degrees centigrade, illustrate the invention.

EXAMPLE 1

10.0 Parts 4-[N-butyl-N-β-(3',4'-dichlorophenylaminocarbonyloxy)-ethyl]-amino-2-methyl-benzaldehyde are dissolved, at 60°, in a solution of 2.5 parts malononitrile and 0.1 part piperidine in 25 parts absolute ethanol, the whole then being heated under reflux for 3 hours followed by cooling, whereupon the dye of formula

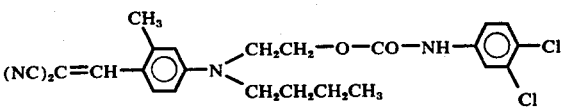

is precipitated in the form of yellow crystals. It was filtered, washed with a little methanol at 0° and dried.

In the following Table are given further dyestuffs of formula I, which may be prepared in analogous manner to the procedure described in the above Example. All the dyestuffs give yellow to greenish-yellow shade on polyester fibre.

Table $R_5$ signifies hydrogen in all the Examples except in Example 33 where $R_5$ signifies 2-$CH_3$; in Example 47 5-Cl; in Example 48 4-Cl; in Example 98 5-$OCH_3$; in Example 150 6-Cl; and in the Examples 81 and 83 6-$CH_3$.

| Ex. No. | $R_1$ | $R_2$ | $R_3$ | $R_4$ |
|---|---|---|---|---|
| 2 | —CH—CH—<br>  \|   \|<br> $CH_3$ $CH_3$ | —$C_2H_5$ | H | 4-O—$SO_2$—$C_6H_5$ |
| 3 | " | —$CH_2CH_2OCOOC_2H_5$ | 2-Cl | 5-$CF_3$ |
| 4 | —$CH_2CH_2$— | —$CH_2CH_2CH_2OC_2H_5$ | 3-Br | 4-cyclohexyloxy |
| 5 | " | —$CH_2CH$—$COOC_2H_5$<br>       \\<br>        $CH_3$ | H | 3-$OC_6H_5$ |
| 6 | 1,2-cyclohexylene | —$CH_2CH_2CH_2CH_3$ | 3-Cl | 4-Cl |
| 7 | " | —$CH_2CH_2O$—$COC_2H_5$ | H | 3-Cl |
| 8 | —$CH_2CH_2CH_2$— | —$CH_2CH_2CH_2O$—$COOCH_3$ | 3-$COOC_2H_5$ | 4-$COOC_2H_5$ |
| 9 | 1,2-cyclopentylene | —$C_2H_5$ | 2-$CH_3$ | 4-$COOCH_2C_6H_5$ |
| 10 | " | —$CH_2CH_2CH_2CH_2C_2H_5$ | H | 4-$COC_6H_5$ |
| 11 | " | —$CH_2CH_2OCH_2CH_2C_2H_5$ | H | 3-$CH_2OC_6H_5$ |
| 12 | —$CH_2C(CH_3)_2$— | —$C_2H_5$ | 3-Cl | 4-$OCOOC_6H_5$ |
| 13 | " | —$CH_2CH_2CO$—$OC_2H_5$ | 3-$CH_3$ | 4-$OCH_2CH_2C_2H_5$ |
| 14 | —$CH_2CH_2$— | —$CH_2CH_2O$—$COCH_2C_2H_5$ | H | 3-O—$COC_6H_5$ |
| 15 | —$CH_2CH$—<br>       \\<br>        $CH_3$ | —$CH_2CH$—O—$COCH_3$<br>       \\<br>        $CH_3$ | 4-$OCH_3$ | 3-CN |
| 16 | " | —$CH_2CH_2CH_2CH_2CH_2OC_2H_5$ | 4-F | 3-Br |
| 17 | —$CH_2CH$—<br>       \\<br>        $C_2H_5$ | —$CH_2CH_2OCH_3$ | H | 4-S—$C_6H_5$ |
| 18 | " | —$CH_2CH_2CO$—$OCH_2CH_2C_2H_5$ | 5-Cl | 3-$OCH_2C_6H_5$ |
| 19 | —$CH_2CH$—<br>       \\<br>        $CH_3$ | cyclohexyl | 3-Cl | 4-Cl |
| 20 | —$CH_2CH$—<br>       \\<br>        $C_2H_5$ | —$CH_2CH_2CH_2CH_2CH(CH_3)_2$ | 4-F | 3-Cl |
| 21 | —$CH_2CH_2$—<br>       \\<br>        $C_2H_5$ | n-$C_8H_{17}$ | 3-Cl | 4-$OC_2H_5$ |
| 22 | —$CH_2CH$—<br>       \\<br>        $CH_3$ | n-$C_4H_9$ | 3-Br | 4-S—$CH_2C_6H_5$ |
| 23 | —$CH_2CH_2$—<br>       \\<br>        $C_2H_5$ | cyclopentyl | -2-$CH_3$ | 4-CO—$OC_2H_5$ |
| 24 | " | cyclohexyl | 3-$C_2H_5$ | 4-Cl |
| 25 | —$CH_2CH$—<br>       \\<br>        $C_2H_5$ | —$C_2H_5$ | 4-$OCH_3$ | 3-$C_6H_5$ |

Table-continued

R₅ signifies hydrogen in all the Examples except in Example 33 where R₅ signifies 2-CH₃; in Example 47 5-Cl; in Example 48 4-Cl; in Example 98 5-OCH₃; in Example 150 6-Cl; and in the Examples 81 and 83 6-CH₃.

| Ex. No. | $R_1$ | $R_2$ | $R_3$ | $R_4$ |
|---|---|---|---|---|
| 26 | —CH₂CH(CH₃)— | —CH₂CH₂CH(CH₃)₂ | 4-OC₂H₅ | 3-CN |
| 27 | " | —C₂H₅ | 3-CO—OC₂H₅ | 4-Cl |
| 28 | —CH₂CH(C₂H₅)— | " | H | 4-OC₆H₅ |
| 29 | —CH₂CH(CH₃)— | —CH₂CH₂C₂H₅ | H | 4-CO—OCH₂CH₂C₂H₅ |
| 30 | —CH₂CH₂— | cyclohexyl | H | 3-CO—OC₆H₅ |
| 31 | —CH₂CH(C₂H₅)— | —C₂H₅ | 4-Cl | 3-S—CH₂CH₂C₂H₅ |
| 32 | —CH₂CH(CH₃)— | —CH₂CH₂C₂H₅ | H | 3-CH₂CH₂C₆H₅ |
| 33 | " | " | 6-CH₃ | 4-COOC₂H₅ |
| 34 | " | " | H | 4-I |
| 35 | —CH₂CH(C₂H₅)— | " | H | 4-COC₆H₅ |
| 36 | —CH₂CH₂— | —C₂H₅ | H | 4-OC₆H₅ |
| 37 | " | " | 3-CH₃ | 4-Br |
| 38 | " | " | 4-OCH₂CH₂CH₃ | 3-Cl |
| 39 | " | " | 4-OCH₂CO—OC₂H₅ | 3-Cl |
| 40 | " | " | 3-Cl | 4-OCH₂C₆H₅ |
| 41 | " | " | H | 4-C₆H₅ |
| 42 | " | " | 4-OCH₃ | 3-C₆H₅ |
| 43 | —CH₂CH₃— | —C₂H₅ | 3-COOC₂H₅ | 4-CO—OC₂H₅ |
| 44 | " | " | 4-Cl | 3-CF₃ |
| 45 | " | " | 3-F | 4-Br |
| 46 | " | " | H | 4-S—CH₂CH₂C₆H₅ |
| 47 | " | " | 2-Cl | 4-Cl |
| 48 | " | " | " | 3-Cl |
| 49 | " | " | H | 4-(3'-chlorophenyl-sulphonyloxy) |
| 50 | " | " | 3-Cl | 4-OSO₂C₆H₅ |
| 51 | " | " | H | 4-cyclohexyl |
| 52 | " | " | H | 4-(3'-methylphenyl sulphonyloxy) |
| 53 | " | " | 3-Cl | 4-CO—OCH₂CH₂C₂H₅ |
| 54 | " | " | H | 3-Br |
| 55 | " | " | H | 4-Br |
| 56 | " | " | H | 4-I |
| 57 | " | " | 4-nC₄H₉ | 2-Cl |
| 58 | " | " | H | 4-(4'-n-butyloxy-carbonylphenyl) |
| 59 | " | " | 4-CH₃ | 3-Br |
| 60 | " | —CH₂C₆H₅ | 3-Cl | 4-Cl |
| 61 | " | " | 3-CO—OC₂H₅ | 4-(3'-methylphenoxy) |
| 62 | " | " | " | 4-cyclohexylcarbonyl |
| 63 | " | " | " | 4-CH₂C₆H₅ |
| 64 | " | " | H | 4-CH₂OC₆H₅ |
| 65 | " | " | H | 3-COOC₆H₅ |
| 66 | " | " | H | 4-OCH₂—CO—OCH₂CH₂C₂H₅ |
| 67 | " | " | 4-OCH₃ | 3-CO—OC₂H₅ |
| 68 | " | " | H | 4-COC₆H₅ |
| 69 | " | —CH₂CH₂C₂H₅ | H | 4-cyclohexylthio |
| 70 | " | " | H | 4-CO—OC₂H₅ |
| 71 | " | " | H | 3-CO—OC₂H₅ |
| 72 | " | " | 4-CH₃ | " |
| 73 | " | " | 3-Cl | 4-CH₂CH₂C₆H₅ |
| 74 | —CH₂CH₂— | —CH₂CH₂C₂H₅ | 3-Br | 4-CH₂OC₆H₅ |
| 75 | " | " | H | 3-SC₆H₅ |
| 76 | " | " | 4-Cl | 3-SCH₂CH₂COOC₂H₅ |
| 77 | " | " | 3-CO—OCH₂CH₂C₂H₅ | 4-CO—OCH₂CH₂C₂H₅ |
| 78 | " | " | 3-OCH₂CH₂OCH₃ | 4-CN |
| 79 | " | " | H | 3-OCH₂C₆H₅ |
| 80 | " | " | H | 4-N=NC₆H₅ |
| 81 | " | —CH₂CH(CH₃)₂ | 3-OCH₃ | 4-OCH₃ |
| 82 | " | —C₂H₅ | 2-Cl | 6-Cl |
| 83 | " | " | 4-C₂H₅ | 2-Br |
| 84 | " | " | H | 3-COOC₂H₅ |
| 85 | " | " | H | 4-OCOC₆H₅ |
| 86 | " | —CH₂CH(CH₃)₂ | H | 4-OCH₂CH₂OC₂H₅ |
| 87 | " | —CH₂CH₂CH₂C₂H₅ | 3-CH₃ | 4-Cl |
| 88 | " | " | 4-nC₄H₉ | 3-Cl |
| 89 | " | " | 3-Cl | 4-CF₃ |
| 90 | " | " | H | 4-C₆H₅ |
| 91 | " | " | H | 3-OCH₂CH₂COOCH₃ |
| 92 | " | " | H | 4-O—COOC₆H₅ |
| 93 | " | —CH₂CH₂—CH(CH₃)₂ | H | 3-OCH₂CH₂—CO—OCH₃ |

Table-continued $R_5$ signifies hydrogen in all the Examples except in Example 33 where $R_5$ signifies 2-$CH_3$; in Example 47 5-Cl; in Example 48 4-Cl; in Example 98 5-$OCH_3$; in Example 150 6-Cl; and in the Examples 81 and 83 6-$CH_3$.

| Ex. No. | $R_1$ | $R_2$ | $R_3$ | $R_4$ |
|---|---|---|---|---|
| 94 | " | " | 3-Cl | 4-Cl |
| 95 | " | " | 4-$CH_3$ | 3-Cl |
| 96 | " | " | H | 3-$OSO_2C_6H_5$ |
| 97 | " | n-$C_6H_{13}$ | H | 4-p-chlorophenoxy |
| 98 | " | " | 2-$OCH_3$ | 4-Cl |
| 99 | " | " | 3-$CH_3$ | 4-$OCOC_6H_5$ |
| 100 | " | n-$C_7H_{15}$ | 3-$COOC_2H_5$ | 4-$COOC_2H_5$ |
| 101 | " | " | H | 4-CO—$OCH_2C_6H_5$ |
| 102 | " | " | 3-Cl | 4-$SCH_2C_2H_5$ |
| 103 | " | " | H | 4-cyclohexylthio |
| 104 | " | —$(CH_2)_4CH(CH_3)_2$ | H | 2-Br |
| 105 | —$CH_2CH_2$— | —$(CH_2)_4CH(CH_3)_2$ | -3-CO—$OC_2H_5$ | 4-Cl |
| 106 | " | n-$C_8H_{17}$ | 4-$CH_3$ | 3-Cl |
| 107 | " | " | H | 4-$COC_6H_5$ |
| 108 | " | —$C_2H_5$ | H | 4-$CH_2SC_6H_5$ |
| 109 | " | " | H | 3-$SC_2H_5$ |
| 110 | " | " | H | 4-N≡N—$C_6H_5$ |
| 111 | " | n-$C_8H_{17}$ | H | 3-$CF_3$ |
| 112 | " | " | 4-$C_2H_5$ | 3-$COC_6H_5$ |
| 113 | " | " | H | 4-Cl |
| 114 | " | " | H | 3-CN |
| 115 | " | " | H | 3-$COOCH(CH_3)_2$ |
| 116 | " | —$(CH_2)_5CH(CH_3)_2$ | H | 3-$SC_2H_5$ |
| 117 | " | " | H | 4-$OSO_2C_6H_5$ |
| 118 | " | " | 4-$CH_3$ | 3-$COC_6H_5$ |
| 119 | " | —$CH_2CH(CH_3)_2$ | 4-Cl | 3-$COOC_2H_5$ |
| 120 | " | —$CH_2C_2H_5$ | H | 4-$COOCH_2CH_2OC_2H_5$ |
| 121 | " | " | H | 4-p-chlorophenoxy |
| 122 | " | " | H | 3-$OCH_2C_6H_5$ |
| 123 | " | —$CH_2CH_2SC_2H_5$ | 3-$CH_2CH_2$—O—4 | |
| 124 | —$CH_2CH$—\\$CH_3$ | cyclopentyl | 3-O—$CH_2$—O—4 | |
| 125 | —$CH_2CH$—\\$C_2H_5$ | n-$C_6H_{13}$ | 2-$CH_2$—$CH_2$—$CH_2$—3 | |
| 126 | —$CH_2CH$—\\$CH_3$ | —$CH_2C_2H_5$ | 3-O⌬4 | |
| 127 | —$CH_2CH_2$— | —$C_2H_5$ | " | |
| 128 | " | " | 3⌬$CH_2$—4 | |
| 129 | " | n-$C_4H_9$ | 3-S⌬4 | |
| 130 | " | " | 3-CH≡CH—CH≡CCl—4 | |
| 131 | " | n-$C_6H_{13}$ | 3-CH≡CH—CH≡CH—4 | |
| 132 | " | " | 3-$CH_2$—$CH_2$—$CH_2$—$CH_2$—4 | |
| 133 | —$CH_2CH_2$— | n-$C_6H_{13}$ | 3-$C(CH_3)$≡CH—S—4 | |
| 134 | " | n-$C_7H_{15}$ | 3-O—$CH_2$—O—4 | |
| 135 | " | —$C_2H_5$ | 3,4-$(CH_2)_3$— | |
| 136 | " | " | 3,4-$(CH_2)_4$— | |
| 137 | " | " | 2,3-$(CH_2)_3$— | |
| 138 | " | " | 2,3-$(CH_2)_4$— | |
| 139 | " | —$(CH_2)_4CH(CH_3)_2$ | 3-O—$CH_2CH_2$—O—4 | |
| 140 | " | n-$C_8H_{17}$ | 3-$CH_2CH_2CH_2$—4 | |
| 141 | " | —$(CH_2)_5CH(CH_3)_2$ | 3-$CH_2CH_2$—O—4 | |
| 142 | " | —$CH_2CH(CH_3)_2$ | 3-$CH_2CH_2$—$SO_2$—4 | |
| 143 | " | —$CH_2C_2H_5$ | 3-CO—O—$CH_2CH_2$—4 | |
| 144 | " | " | 3⌬CO—4 | |
| 145 | " | " | 3-$CH_2$—$CH_2CH_2$—O—4 | |
| 146 | " | " | 4⌬$CH_2CH_2$—3 | |
| 147 | " | —$C_2H_5$ | 2,3-CH≡CH—CH≡CH— | |
| 148 | " | " | 3,4-CH≡CH—CH≡CH— | |
| 149 | " | " | 3,4-O—$CH_2CH_2$—O— | |
| 150 | " | " | 3,4-$(CH_2)_3$— | |

APPLICATION EXAMPLE A 1.0 Part of a dyeing preparation consisting of 35% of the dye of Example 1 and 65% of equal parts of sodium dinaphthylmethane disulphonate and sodium lignin sulphonate is ground for 10 hours in a ball mill. The preparation is made up to a 4000 parts bath, buffered with a mixture of sodium sulphate and formic acid to pH 5 and heated to 60°, following which 0.5 parts of a commercial wetting agent and 40 parts orthophenylphenol solution (30% in water) are added. Then 100 parts of a polyester fabric are entered, the whole heated with stirring to 98° in 30 minutes and held at this temperature for 1 hour. The fabric is then removed from the bath, rinsed, soaped, rinsed again and dried. A deep yellow, even dyeing with good fastness properties is obtained.

APPLICATION EXAMPLE B

Following the procedure of the above Application Example A, but using a polyester fabric pre-mixed for 30 seconds at 190° and carrying out the dyeing in an open vessel at 92°, a dyeing is obtained which is of substantially the same quality as that in Example A.

APPLICATION EXAMPLE C

In a dyeing autoclave a dyeing liquor as described in Example A, but not containing orthophenylphenol, is prepared and the polyester fabric entered at 60°. The dye vessel is closed, the bath raised to 130° in 50 minutes and the fabric dyed for 60 minutes at this temperature. Over the course of 20 minutes, the bath is cooled to 60° and the fabric removed and further treated as described in Application Example A. A dyeing of the same quality was obtained.

Following the procedure described in Application Examples A to C, but using, in place of the sodium sulphate/formic acid buffer, a phosphate buffer to adjust the pH to 6, a dyeing of the same quality is obtained.

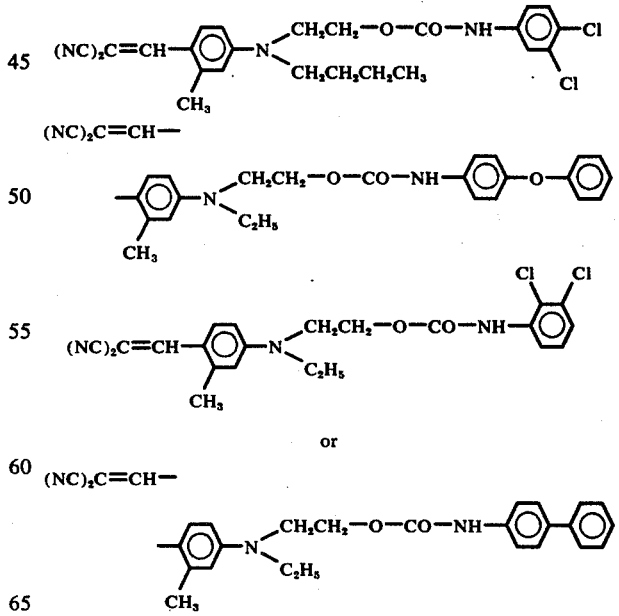

What is claimed is:

1. A compound of formula I,

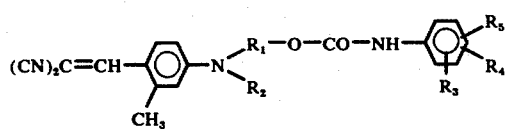

in which
R$_1$ is C$_{2-8}$alkylene or C$_{5-8}$cycloalkylene,
R$_2$ is C$_{5-8}$cycloalkyl, unsubstituted or substituted by up to 3 methyl groups; or C$_{1-8}$-alkyl, unsubstituted or substituted by a C$_{1-4}$alkoxy, C$_{1-4}$alkylthio, C$_{1-4}$alkylcarbonyloxy, C$_{1-4}$alkoxycarbonyloxy or C$_{1-4}$alkoxycarbonyl,
either R$_3$ is hydrogen, halogen, C$_{1-4}$alkyl, C$_{1-4}$-alkoxy or C$_{1-4}$alkoxycarbonyl,
and R$_4$ is halogen, cyano, trifluoromethyl, C$_{5-8}$-cycloalkyl, C$_{1-4}$alkoxy, C$_{5-8}$cycloalkoxy, C$_{1-4}$al-kylthio, C$_{5-8}$cycloalkylthio, phenyl, phenoxy, phenylthio, phenylthio-C$_{1-4}$alkyl, phenyl-C$_{1-4}$alkyl, phenoxy-C$_{1-4}$alkyl, C$_{1-4}$alkoxycarbonyl, C$_{5-8}$-cycloalkoxycarbonyl, phenoxycarbonyl, benzoyl, benzoyloxy, phenoxycarbonyloxy, or phenyl-C$_{1-4}$alkylthio,
or R$_3$ and R$_4$ are located on adjacent carbon atoms and, together with such atoms, form a 5- or 6-membered, otherwise saturated, unsaturated or aromatic, carbocyclic ring, optionally having a benzene ring fused thereto, and
R$_5$ is hydrogen, chlorine, bromine, methyl or methoxy;
any alkyl or alkoxy radical as R$_3$ or R$_4$ being optionally substituted by C$_{1-4}$alkoxy, phenyl or C$_{1-4}$-alkoxycarbonyl;
any cycloalkyl radical or moiety as or contained in R$_4$ being optionally substituted by up to 3 methyls or by C$_{1-4}$alkoxy, phenyl or C$_{1-4}$alkoxycarbonyl;
any phenyl radical or moiety as or contained in R$_4$ being optionally substituted by up to two substituents selected from halogen, methyl, C$_{1-4}$alkoxy and C$_{1-4}$alkoxycarbonyl, with the proviso that any alkoxy radical substituted by alkoxy is of at least two carbon atoms.

2. A compound of claim 1, wherein R$_1$ is C$_{2-4}$ alkylene, there being two carbon atoms between the N and O atoms, R$_2$ is C$_{2-8}$alkyl, unsubstituted or substituted by C$_{1-4}$alkoxy, C$_{1-4}$alkylthio, C$_{1-4}$alkylcarbonyloxy, C$_{1-4}$alkoxycarbonyloxy or C$_{1-4}$alkoxycarbonyl, R$_3$ is hydrogen, chlorine, bromine, C$_{1-4}$alkyl, C$_{1-4}$alkoxy or C$_{1-4}$alkoxycarbonyl, R$_4$ is as defined in claim 1 and R$_5$ is hydrogen, chlorine, methyl or methoxy.

3. A compound of claim 2, wherein R$_2$ is C$_{2-8}$-alkyl, unsubstituted or substituted by a C$_{1-4}$alkoxy, and R$_4$ is chlorine, bromine, cyano, trifluoromethyl, cyclohexyl, C$_{1-4}$-alkoxy, C$_{1-4}$alkylthio, phenyl, phenoxy, phenylthio, phenylC$_{1-4}$alkyl, phenyl-C$_{1-4}$alkoxy, phenoxy-C$_{1-4}$alkyl, C$_{1-4}$alkoxycarbonyl, or phenoxycarbonyl.

4. A compound of claim 2, wherein R$_1$ is 1,2-ethylene, 1,2-propylene or 1,2-butylene, the 1-C-atom being bound to the nitrogen, and R$_2$ is alkyl of 2 to 8 carbon atoms, unsubstituted or substituted by C$_{1-4}$alkoxy.

5. A compound of claim 3, wherein R$_1$ is 1,2-ethylene, 1,2-propylene or 1,2-butylene, the 1-C-atom being bound to the nitrogen, R$_2$ is unsubstituted C$_{2-8}$alkyl, R$_3$ is hydrogen, chlorine, bromine, C$_{1-4}$alkyl, C$_{1-4}$alkoxy or C$_{1-4}$-alkoxycarbonyl and R$_5$ is hydrogen, chlorine, methyl or methoxy.

6. A compound of claim 5, wherein R$_1$ is 1,2-ethylene, R$_4$ is chlorine, bromine, cyano or C$_{1-4}$alkoxycarbonyl and R$_5$ is hydrogen.

7. A compound of claim 6, wherein at least one of R$_3$ and R$_4$ is chlorine.

8. A compound of claim 7, wherein both R$_3$ and R$_4$ are chlorine.

9. A compound of claim 6, wherein R$_2$ is unsubstituted C$_{2-4}$alkyl.

10. A compound of claim 9, wherein R$_2$ is ethyl or n-butyl.

11. A compound of claim 5, of formula